(12) United States Patent
Heuze et al.

(10) Patent No.: US 6,470,934 B2
(45) Date of Patent: Oct. 29, 2002

(54) RUNFLAT SYSTEM FOR A MOTOR VEHICLE

(75) Inventors: Olivier Heuze, L'Isle Adam (FR); Eric Michelot, Cergy (FR); Eric Carpentier, Champagne/Oise (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/873,970

(22) Filed: Jun. 4, 2001

(65) Prior Publication Data

US 2002/0036044 A1 Mar. 28, 2002

(30) Foreign Application Priority Data

Sep. 22, 2000 (FR) .............................. 00 12085

(51) Int. Cl.⁷ .................. B60C 17/00; B60C 17/04; B60C 17/06
(52) U.S. Cl. ....................... 152/158; 152/520
(58) Field of Search .................. 152/158, 520

(56) References Cited

U.S. PATENT DOCUMENTS 3,645,312 A  2/1972  Kolodziej
3,968,825 A  * 7/1976  Mitchell et al. ............ 152/158
4,252,170 A  2/1981  Watts

FOREIGN PATENT DOCUMENTS

| DE | 11 76 013 B | 8/1964 |
| DE | 29 09 057 A | 10/1979 |
| DE | 36 35 890 A1 | 5/1988 |
| DE | 298 00 079 U1 | 3/1998 |
| JP | 58180307 A | 10/1983 |
| JP | 03231007 A | 10/1991 |

* cited by examiner

*Primary Examiner*—Adrienne C. Johnstone
(74) *Attorney, Agent, or Firm*—Alston & Bird LLP

(57) ABSTRACT

A runflat system for a motor vehicle, comprising a non-standard one-piece rim having at least a first peripheral cavity or drop center to enable a tire to be mounted on the rim, and a runflat device for mounting on the rim inside the tire, said device being constituted by a rigid ring split into at least two circularly arcuate elements or sectors, wherein the rim has at least one second peripheral cavity which is separated from the first cavity by an intermediate peripheral ridge, wherein each sector of the ring has a radially inner portion for being received in the second cavity of the rim, and wherein the system also comprises means for fixing the sectors in the second cavity of the rim.

9 Claims, 5 Drawing Sheets

RUNFLAT SYSTEM FOR A MOTOR VEHICLE

The invention relates to a runflat system for a motor vehicle, such a system enabling the vehicle to travel a considerable distance at relatively high speed with a tubeless tire that is partially or totally deflated.

BACKGROUND OF THE INVENTION

In general, for fitting to civilian vehicles, runflat devices must be suitable for mounting on standard wheel rims, i.e. on one-piece rims having a drop center.

Presently known runflat devices are generally constituted by a ring which is mounted tightly around the wheel rim inside the tire. The ring is either made as a relatively flexible single piece from which a slice has been removed, or else of at least two circularly arcuate rigid pieces or "sectors". To enable the ring to be mounted tightly against the rim, it is necessary to provide assembly and clamping fasteners between the facing ends of the ring sectors. The assembly and clamping fasteners are rigid and constituted by mechanical elements such as nuts and bolts, for example.

Unfortunately, experience shows that rigid fasteners constitute the weak link in runflat devices (e.g. due to fatigue phenomena). Furthermore, mounting a runflat device is an operation that requires the operator to be specially trained in particular because of the small amount of space available for receiving the tool required for clamping the ring on the rim.

In document FR-97/13618 in the name of the Applicant, the runflat device is constituted in such a manner as to eliminate assembly and clamping fasteners. It comprises at least one open inner ring of relatively rigid material for mounting on the rim, and a substantially inextensible continuous outer ring engaged on the inner ring so as to clamp it and fix it on the rim.

In an improvement proposed in document FR-98/04225, also in the name of the Applicant, the ring is made up of three parts, namely:

two first annular parts that are open via respective slices and that are designed to be mounted one on the other around the rim; and a third annular part that is continuous and coaxial with the above two parts, said third part serving to clamp the resulting system on the rim.

Runflat devices are also known which are designed to be mounted on non-standard rims made up of two portions, and in which the means for fixing together the two portions of the rim are also used for fixing the sectors of the ring.

OBJECTS AND SUMMARY OF THE INVENTION

An object of the invention is likewise to avoid the use of assembly and clamping fasteners between the sectors of a runflat ring on a one-piece non-standard rim.

To this end, the invention provides a runflat system for a motor vehicle, the system comprising a non-standard one-piece rim having at least a first peripheral cavity or drop center to enable a tire to be mounted on the rim, and a runflat device for mounting on the rim inside the tire, the device being constituted by a rigid ring split into at least two circularly arcuate elements or sectors, wherein the rim presents at least one second peripheral cavity which is separated from the first cavity by an intermediate peripheral ridge, wherein each sector of the ring presents a radially inner portion for being received in the second cavity, and wherein the system also has means for fixing the sectors in the second rim cavity.

According to another characteristic of the invention, the means for fixing the ring sectors on the rim comprise first means for taking up lateral forces tending to move the sectors laterally inside the second cavity.

Advantageously, the first fixing means are constituted by spacers suitable for penetrating into the second cavity of the rim so as to engage between the intermediate ridge and at least one ring sector to act as a wedge and prevent the set of sectors of the ring from moving laterally.

In an embodiment of the invention, the spacers are carried by the sectors of the ring and they are pivotally mounted.

The means for fixing the sectors of the ring on the rim also comprise second means for taking up transverse forces or centrifugal forces tending to cause the sectors to move out from the second cavity of the rim.

The second means for fixing the sectors of the ring on the rim comprise at least one lip provided in the radially inner portion of each sector, and a groove provided in the second cavity of the rim and in which said lip is engaged.

Advantageously, the second means for fixing sectors of the ring on the rim comprise two lips provided in the radially inner portion of each sector, and two grooves formed in the second cavity of the rim and into which the two lips are engaged, respectively.

A runflat system of the present invention presents numerous advantages, and particular mention can be made of the following:

there are no assembly and clamping fasteners between any two consecutive sectors of the ring, thus enabling the structure of the ring to be lightened and minimizing the spacing required between two consecutive sectors of the ring;

the sectors of the ring can be mounted easily around the rim without requiring any special tooling; and the means for fixing the sectors of the ring on the rim do not require any element to be screwed into the rim, where such elements would weaken the mechanical strength of the rim.

BRIEF DESCRIPTION OF THE DRAWINGS

Other advantages, characteristics, and details of the invention appear from the following explanatory description made with reference to the accompanying drawings, given purely by way of example, and in which.

MORE DETAILED DESCRIPTION

Figure 1:
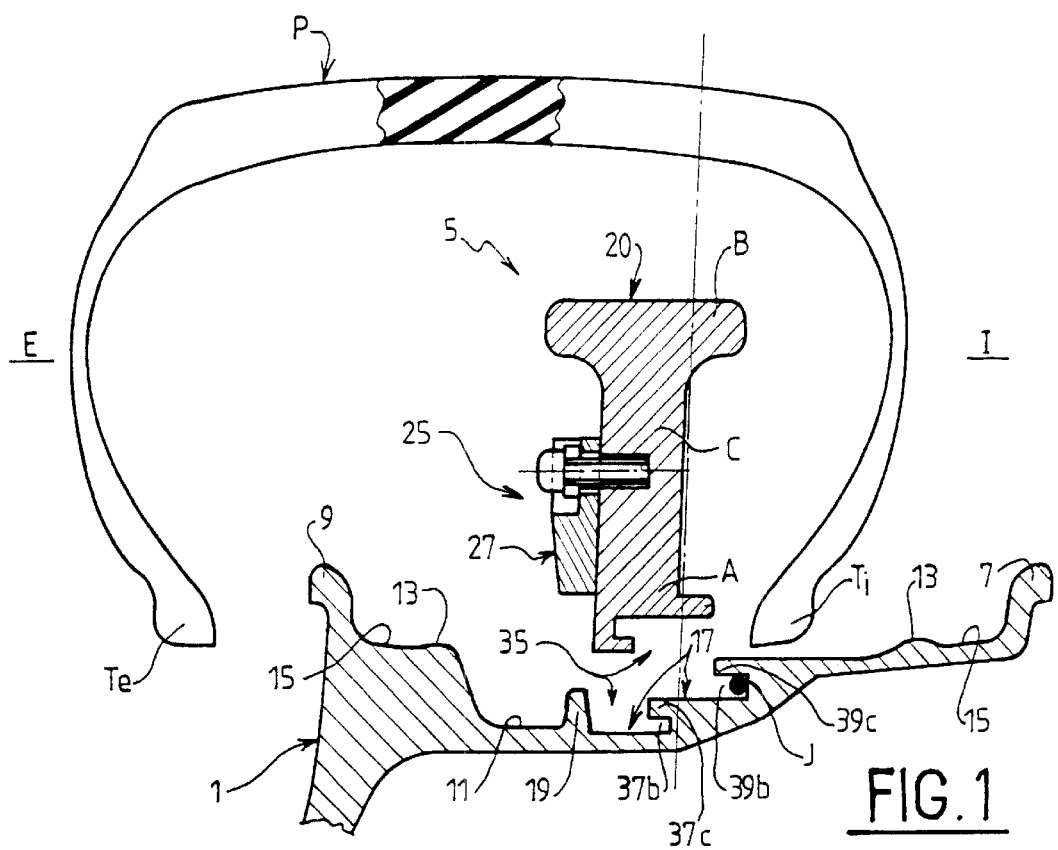
FIG. 1 is a half-view in axial section of a non-standard one-piece rim, a tire, and a runflat device in a system of the invention, prior to said elements being assembled together.

A runflat system of the invention comprises in particular a non-standard one-piece rim 1, a tire P, and a runflat device 5 which are shown in FIG. 1 prior to being assembled together.

Relative to the motor vehicle, the rim 1 and the tire P present an inner side I and an outer side E, and the adjectives "inner" and "outer" are used in the description below with reference to these two sides.

In general, and with reference to FIG. 1, the rim 1 is a one-piece annular part having points in common with a standard rim, namely:

two rim flanges, specifically an inner peripheral flange 7 and an outer peripheral flange 9;

a drop center 11 in the central portion of the rim, said drop center 11 forming an outer first peripheral cavity; and two peripheral humps 13 adjacent to the two peripheral flanges 7 and 9 respectively to define two wells 15 for receiving the inner and outer beads $T_i$ and $T_e$ of the tire P once it is inflated.

Furthermore, in a characteristic that is common to all embodiments of the invention described below, the rim 1 has at least one inner second peripheral cavity 17 on the same axis as the first cavity 11 and separated therefrom by an intermediate peripheral ridge 19.

Figure 2:
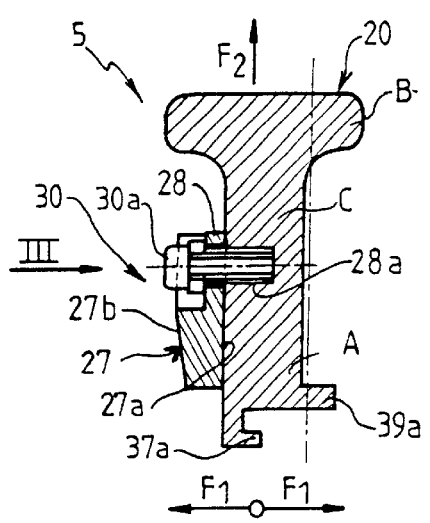
FIG. 2 is a section view of a sector of the ring of the runflat device.

In general, and with reference to FIG. 2, the run-flat device 5 is constituted by a rigid ring which is split into at least two circularly arcuate elements or sectors 20. The sectors 20 of the ring are independent from each other and they are fitted separately around the rim 1 without any linking fasteners assembling pairs of sectors together. Advantageously, the ring can be made as a single piece which is then split into a plurality of sectors 20 using a cutting tool, e.g. a saw, so as to minimize the spacing that exists between the sectors once they have been fitted around the rim 1.

The number of sectors 20 constituting the ring can vary, in particular as a function of the dimensions of the ring relative to the dimensions of the tire P. The ring can be made of aluminum, but it is preferably made of a plastics material of the polyamide type, possibly filled with glass fibers, for example, in order to reinforce its mechanical strength and its ability to withstand high temperatures. Each sector 20 of the ring can have a tread-forming coating of rubber on its outer periphery that comes into flexible contact with the tire P when running flat, in particular if the sectors are made of aluminum.

Each sector 20 of the ring has a central zone C or "beam", a radially inner zone A, and a radially outer zone B whose periphery forms the runflat tread surface against which the tread of the tire bears if the tire is punctured, and which can form an outwardly directed projection (not shown) so as to limit sideways movement of the tire P.

The system of the invention also has sector-fixing means 20 formed in the second cavity 17 of the rim 1.

Figure 3:
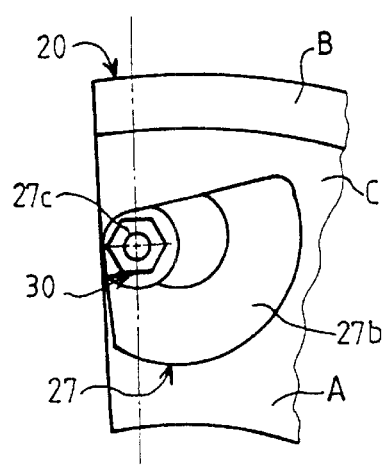
FIG. 3 is a view seen along arrow III of FIG. 2.

With reference to FIGS. 1 to 3, the fixing means comprise first means 25 for taking up lateral forces (along arrows F1 in FIG. 2) tending to move the sectors 20 of the ring laterally inside the second cavity 17.

These first means 25 are constituted by spacers 27 designed to penetrate into the second cavity 17 of the rim 1 so as to be engaged between the intermediate ridge 19 and the sectors 20 of the ring so as to act as wedges and prevent the set of sectors 20 of the ring from moving laterally in the second cavity 17.

In the embodiment shown in FIGS. 1 to 3, the spacers 27 are advantageously carried by the sectors 20 of the ring and are pivotally mounted. More precisely, each spacer 27 has a bearing face 27a for pressing against the outer face of the beam C of a sector 20 of the ring, fitting the shape thereof, and an opposite face 27b having a slope so that the thickness of the spacer 27 tapers progressively from one end to the other, thereby forming a wedge-shape.

In its thick portion, each spacer 27 is pierced by an opening 28 which receives an element 30 for fixing it to a sector 20 and also for acting as a pivot axis. This element 30 can be a rod which is engaged by force through the opening 28 into a blind hole 28a pierced in the sector 20, and it can be terminated by a shoulder 30a for fixing the spacer 27 to the sector 20. In order to enable the spacer 27 to be pivoted merely by using a wench, the spacer 27 is provided with a hexagonal portion in relief 27c. This portion 27c in relief can be a separate piece welded thereto, or can be formed by machining, for example. In a variant, this element 30 can be constituted by a bolt which is tightened after the spacer 27 has been positioned in the second cavity 17 of the rim 1.

In general, the number of spacers 27 varies as a function of the number of sectors 20, given that any one sector can have one or more spacers, or even none. In particular, a spacer 27 can be mounted close to an end of a sector 20 so as to be suitable for overlapping two consecutive sectors 20 simultaneously and preventing both of them from moving relative to the second cavity 17 of the rim 1.

Thus, for a ring that is split into two sectors 20, four spacers 27 may be provided, i.e. two spacers for overlapping the adjacent ends of the two sectors, and one spacer in the middle of each sector. However, when a ring is split into three sectors, it is possible to use only three spacers each overlapping two adjacent ends of the three sectors.

In general, the spacers 27 are rigid and made of steel, of aluminum, or of a reinforced plastics material.

The fixing means also comprise second means 35 for taking up transverse forces (along arrow F2 in FIG. 2) tending to cause the sectors 20 of the ring to escape from the second cavity 17 of the rim 1.

The second means 35 comprise at least one lip provided in the radially inner zone A of each sector 20, and a lateral groove formed in the second cavity 17 of the rim 1 and in which the lip is engaged.

In the embodiment shown in FIGS. 1 and 2, the radially inner zone A of each sector 20 of the ring advantageously has two circularly arcuate lateral lips 37a and 39a that are L-shaped in section, and that are designed to engage in two respective lateral grooves 37b and 39b in the second cavity 17 of the rim 1.

More precisely, the lip 37a is situated at the end of the radially inner zone A of the sector 20 of the ring on the outer side of the sector, while the lip 39a projects from the inner side of the sector 20 of the ring. In other words, the two lips 37a and 39a are advantageously offset relative to each other so as to prevent the sectors 20 of the ring tilting, i.e. so as to take up transverse forces better.

The two lateral grooves 37b and 39b are formed in the inner side wall of the second cavity 17 of the rim 1, while the outer side wall of the second cavity 17 is formed by the inner side face of the intermediate ridge 19. Each of the two grooves 37b and 39b is defined by two successive peripheral ridges 37c and 39c of the rim, and they are axially offset relative to each other so as to receive the two lips 37a and 39a of the sectors 20.

With reference to FIGS. 4 to 13 in succession, there follows a description of how the system of the invention is mounted.

Figure 4:
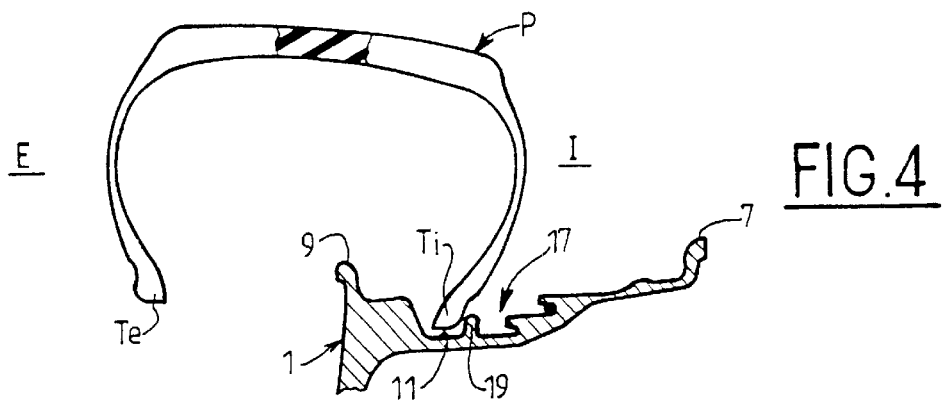
FIGS. 4 to 13 are half-views in axial section to show how the runflat system of the invention is mounted.

In FIG. 4, the tire P is mounted in part on the rim 1 by passing only its inner bead $T_i$ onto the rim 1 while making use of the first cavity 11 or drop center, with the presence of the drop center being necessary to enable the beads $T_i$ and $T_e$ of the tire P to pass over the flange 9 of the rim 1.

Figure 5:
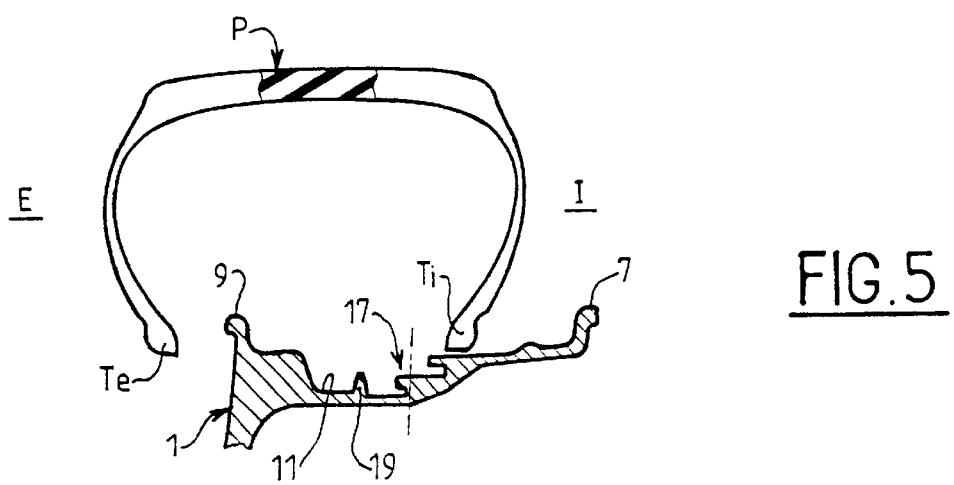

In FIG. 5, the inner bead $T_i$ is extracted from the drop center 11 while the outer bead $T_e$ of the tire P remains outside the rim 1 so as to allow the runflat device 5 to be inserted.

Figure 6:
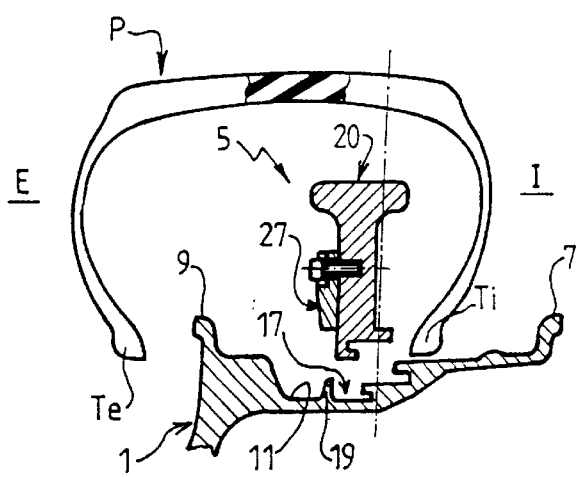
Figure 7:
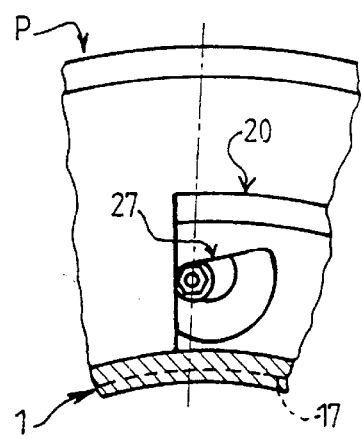

In FIGS. 6 and 7, the sectors 20 of the runflat device 5 are inserted inside the tire P and around the rim 1, and the spacers 27 (FIG. 7) occupy a "retracted" first position so that they do not impede positioning the sectors 20 around the rim 1.

Figure 8:
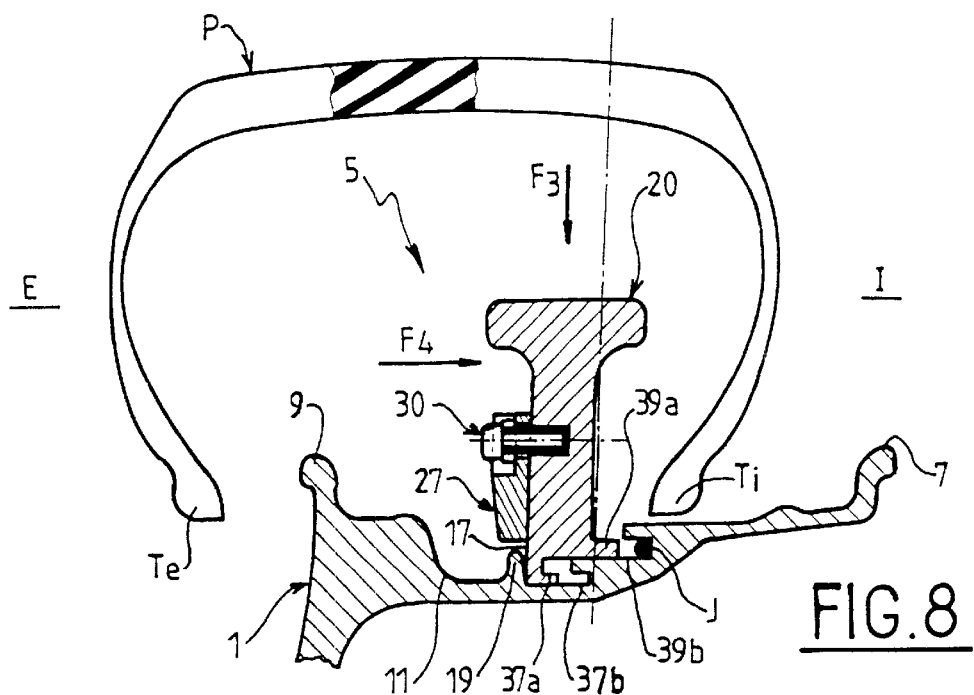
Figure 9:
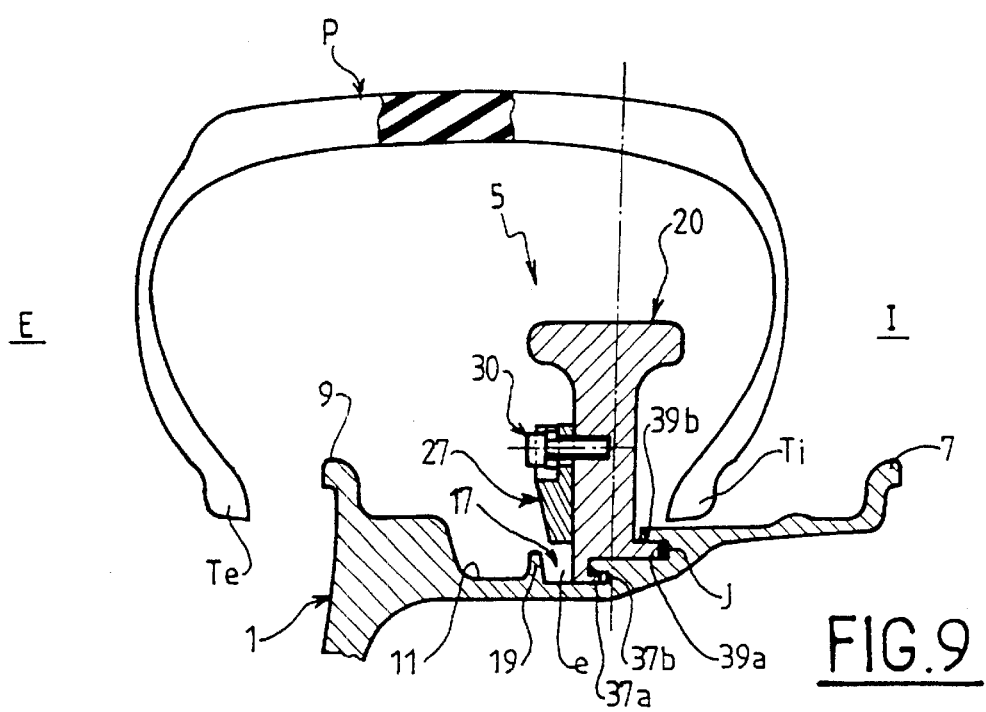

In FIG. 8, each sector 20 of the ring is moved along arrow F3 so as to cause its radially inner portion A to penetrate into the second cavity 17 of the rim 1, and is then moved along arrow F4 so as to engage its two lips 37a and 39a in the lateral grooves 37b and 39b of the second cavity 17 of the rim 1. This releases an annular gap e between the sectors 20 and the intermediate ridge 19 of the rim 1 suitable for receiving the spacers 27, as shown in FIG. 9.

Figure 10:
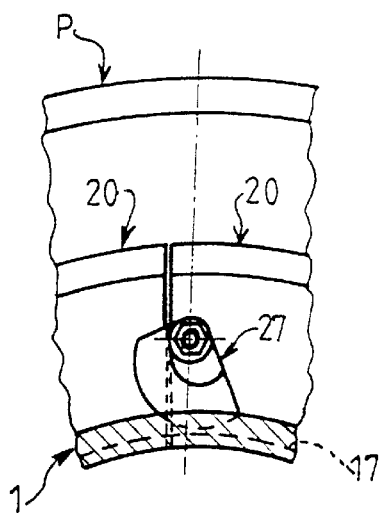

In FIG. 10, a spacer 27 is pivoted through a first angle by means of a wrench so as to engage part of the spacer in the gap e and thus lock the sector 20 to some extent. In this example, the spacer 27 is situated close to one end of the sector 20 so as to be capable of overlying the following sector.

Figure 11:
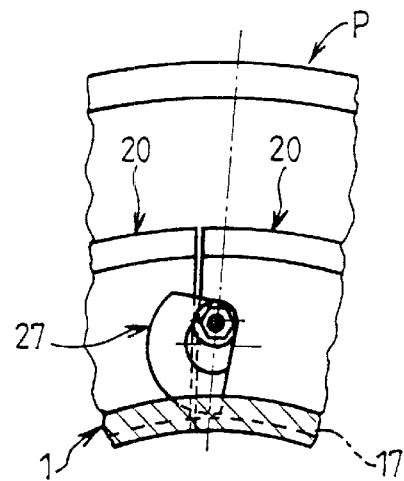
Figure 12:
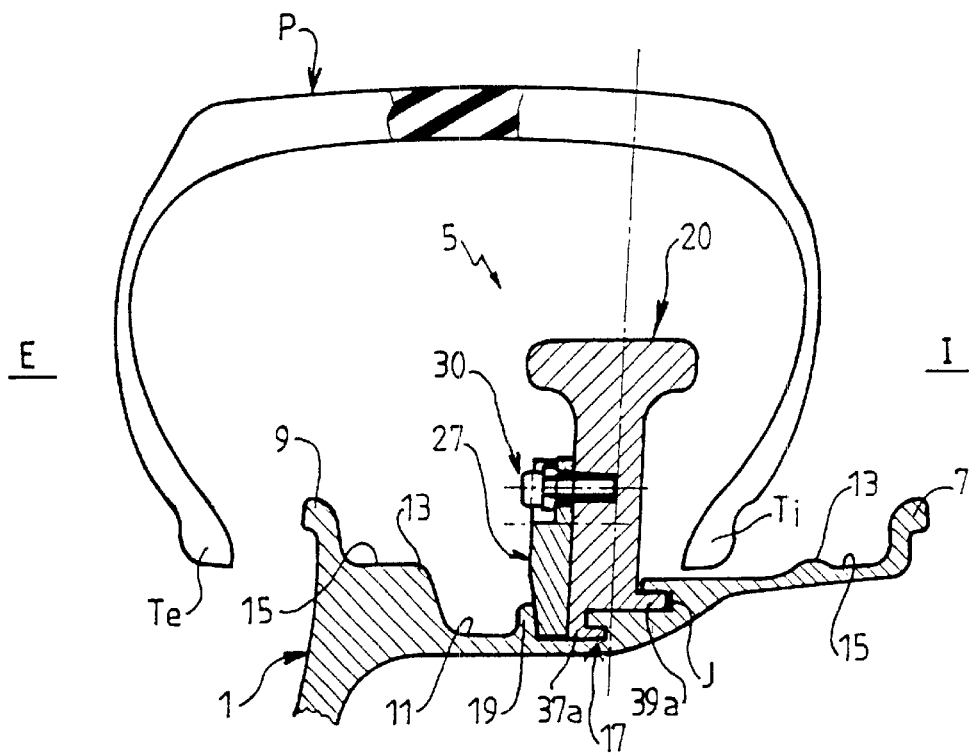

In FIGS. 11 and 12, the spacer 27 is pivoted further so as to provide tighter locking. In order to accommodate manufacturing tolerances and provide satisfactory lateral locking of the sectors 20 in the second cavity 17 of the rim 1, at least one O-ring J is placed in the bottom of the groove 39b, for example, so as to be compressed when the spacers 27 are engaged in the gap e.

Figure 13:
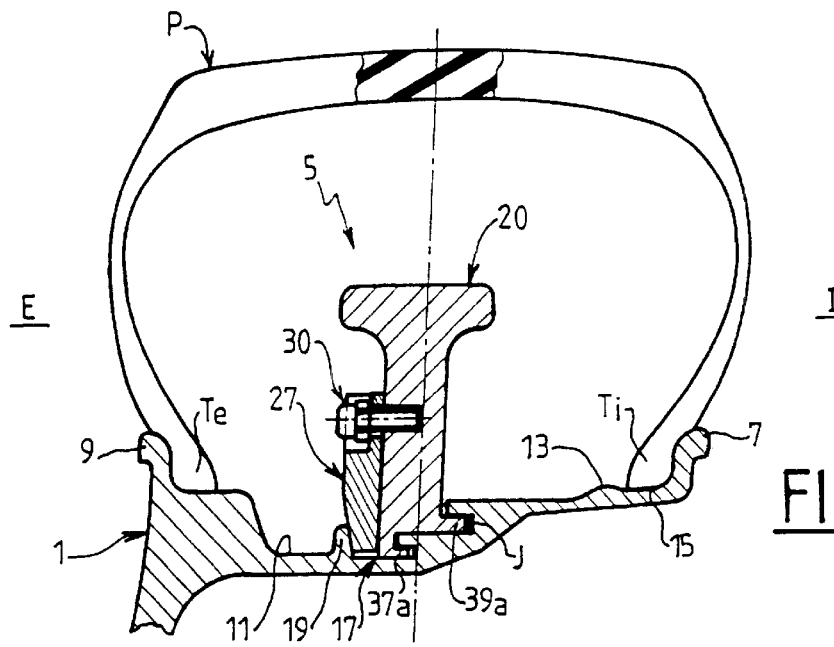

Finally, in FIG. 13, the outer bead $T_e$ of the tire P has been put into place using the drop center 11, after which the tire P can be inflated so as to press its beads $T_e$ and $T_i$ into their respective wells 15.

Figure 14:
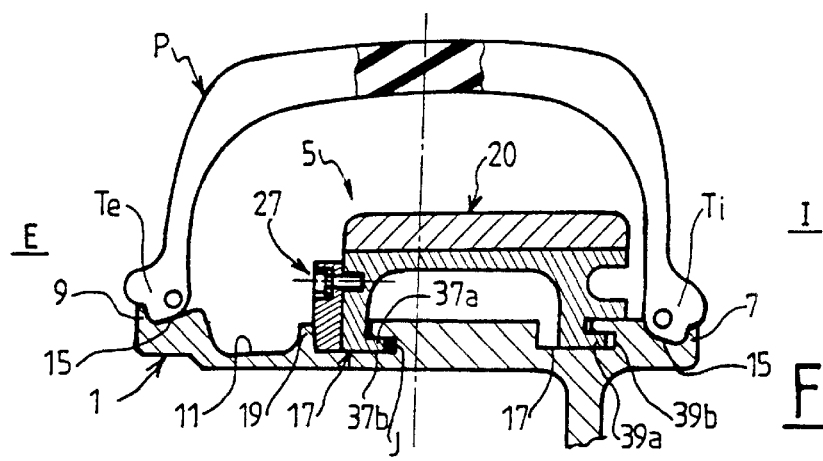
FIG. 14 is a half-view in axial section showing a first variant runflat system of the invention.

A first variant embodiment is shown in FIG. 14 which is particularly well adapted to a tire P of low aspect ratio, i.e. a tire in which the height between the rim 1 and the tire P is small compared with a conventional tire. In this case, the ring of the runflat device 5 extends over a greater width, but the principle whereby it is mounted and fixed remains the same as that described above.

Figure 15:
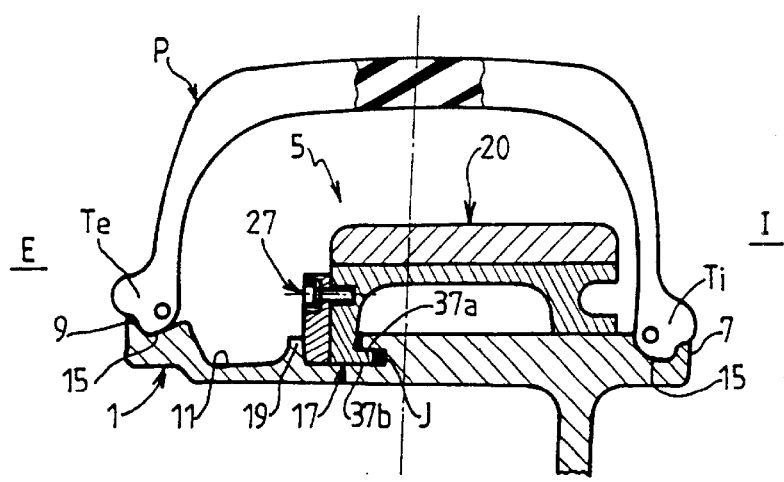
FIG. 15 is a half-view in axial section of a second variant runflat system of the invention.

In a second variant shown in FIG. 15, the second means 35 for fixing the sectors 20 to the rim 1 in order to take up transverse forces comprise only one lip 37a on the radially inner portion A of the sectors 20, together with a single groove 37b formed in the second cavity 17 of the rim 1.

In both of these two variant embodiments, the end face of the radially inner portion A of the sectors 20 is hollowed out so as to reduce the weight of the runflat device 5.

The intermediate peripheral ridge 19 between the two cavities 11 and 17 of the rim 1 can be continuous or discontinuous. If it is discontinuous, it is then constituted by a series of studs, and the sectors 20 of the ring must be mounted on the rim 1 in such a manner that the spacers 27 are in register with the studs.

What is claimed is:

1. A runflat system for a motor vehicle, the system comprising a non-standard one-piece rim having at least a first peripheral cavity or drop center to enable a tire to be mounted on the rim and a second peripheral cavity separated from the first cavity by an intermediate peripheral ridge, and a runflat device for mounting on the rim inside the tire, said runflat device being constituted by a rigid ring split into at least two circularly arcuate elements or sectors, wherein each sector has a radially inner portion for being received in the second cavity, the system also having means for fixing the sectors in the second cavity of the rim, wherein the means for fixing the sectors of the ring on the rim comprise at least first means for taking up lateral forces tending to move the sectors laterally inside the second cavity of the rim, and wherein these first fixing means are constituted by spacers suitable for penetrating into the second cavity of the rim in order to engage between the intermediate ridge and at least one sector of the ring so as to act as a wedge and prevent the set of sectors of the ring from moving laterally inside the second cavity of the rim.

2. A runflat system according to claim 1, wherein the spacers are carried by the sectors of the ring and are pivotally mounted.

3. A runflat system according to claim 2, wherein each spacer has a bearing face for pressing against the outer side face of a sector of the ring, and an opposite face which slopes so that the thickness of the spacer tapers progressively from one end towards the other so as to form a wedge-shape.

4. A runflat system according to claim 3, wherein each spacer is pierced by a through opening in its thick portion, said opening receiving an element for fixing the spacer to the sector and, where appropriate, for clamping it thereto.

5. A runflat system according to claim 3, wherein a spacer carried by one sector also overlaps a sector following said sector so as to provide at least part of the fastening preventing both sectors from moving in the second cavity of the rim.

6. A runflat system according to claim 1, wherein the means for fixing the sectors of the ring on the rim include second means for taking up transverse forces tending to cause the sectors to escape from the second cavity of the rim.

7. A runflat system according to claim 6, wherein the second fixing means for fixing the sectors of the ring on the rim comprise at least one lip provided on the radially inner portion of each sector, and a groove formed in the second cavity of the rim and in which each said lip is respectively engaged.

8. A runflat system according to claim 7, wherein an O-ring is engaged in at least one groove of the second cavity of the rim.

9. A runflat system according to claim 6, wherein the second fixing means for fixing the sectors of the ring on the rim comprise two lips provided on the radially inner portion of each sector, and two grooves formed in the second cavity of the rim and in which the two lips are respectively engaged.

* * * * *